Aug. 17, 1926.

W. S. WEIR ET AL 1,596,327

FLEXIBLE COUPLING

Filed Dec. 10, 1925

WITNESSES

H. A. LaClair

W. S. Weir
A. P. Foley } INVENTORS

BY

ATTORNEYS

Patented Aug. 17, 1926.

1,596,327

UNITED STATES PATENT OFFICE.

WILLIAM SHARPE WEIR AND ALBERT PAUL FOLEY, OF PITTSBURGH, PENNSYLVANIA.

FLEXIBLE COUPLING.

Application filed December 10, 1925. Serial No. 74,593.

Our present invention relates generally to flexible couplings, and more particularly to flexible couplings of that type embodying two coupling members utilized upon the adjacent ends of alined shafts, each with a circumferential series of openings paralleling the shafts, and connected by virtue of elements secured through the openings of one member and movably disposed in the openings of the other member. Ordinarily such elements include within the openings of the member in which they are movable, cushions formed of rubber, and experience has shown that these cushions rapidly deteriorate in use, especially when exposed to oil, water and grime, and that they enlarge, become rigid, or rot out, and in either case defeat the purposes for which they are intended, to the great disadvantage of the parts in connection with which the coupling is employed.

It is a primary object of our invention to provide for the complete protection of the cushions in such manner as to defeat rotting, swelling and hardening, and to insure lasting efficient life, and it is a further object of our invention to do this by an improvement applied to the coupling elements alone, which will be simple, easy to manufacture and extremely economical when the advantages thereof are taken into consideration.

Figure 1:
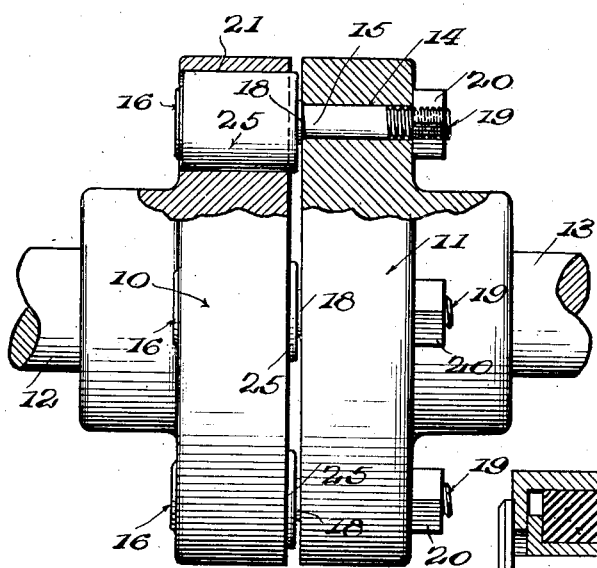
Figure 4:
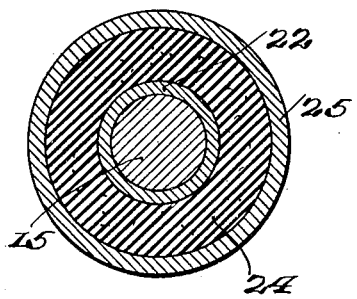
Figure 3:
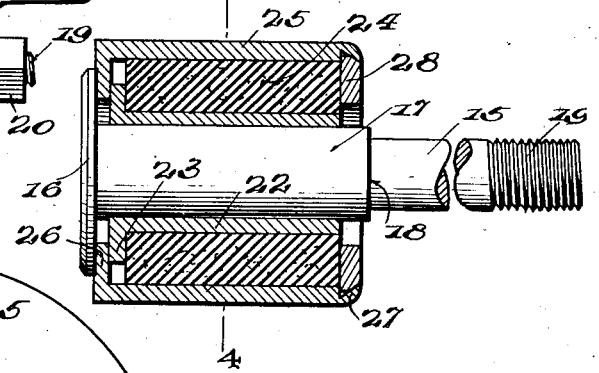
Figure 2:
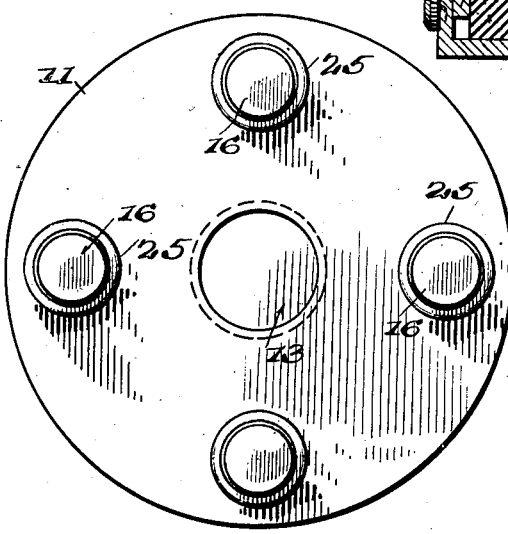
Figure 5:
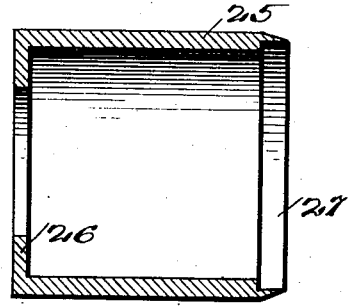

In the accompanying drawing which illustrates our present invention and forms a part of this specification, Figure 1 is a side view of a coupling, illustrating our invention, the view being partly in elevation and partly in section, Figure 2 is a face view of one of the coupling members, disconnected with its several coupling elements from the other member, Figure 3 is a detail longitudinal section through our invention as applied to one of the coupling elements, Figure 4 is a detail transverse section taken therethrough substantially on the line 4—4 of Figure 3, and Figure 5 is a central longitudinal section through the cushion casing.

Referring now to these figures, and particularly to Figure 1, we have shown a flexible coupling including a pair of cylindrical coupling members 10 and 11 secured upon the adjacent ends of alined shafts 12 and 13. Through a circumferential series of openings 14 of the member 11 are secured a series of supports in the nature of bolts 15. Each bolt has an enlarged flat head 16 at one end and a cylindrically enlarged portion 17 adjacent to said head, forming at one end of the enlarged portion 17 an annular shoulder 18 adapted to abut one surface of the coupling member 11. The other end of each bolt is threaded as at 19 to receive a nut 20 against the other surface of the member 11 whereby to thus lock the bolt in place.

According to the usual practice the foregoing structure is employed with a bushing on the cylindrically enlarged portion 17 of each bolt 15, and a cylindrical cushion of rubber is seated on the bushing within one of the circumferential series of openings 21 of the coupling member 10. Such an arrangement, as above stated, is open to the objection that the rubber cushions harden, swell, and stick within the openings of the coupling member 10 and in other instances, rot due to the deteriorating influence of oil. water and grime so as to defeat the free lengthwise movement within the openings 21 of the coupling member 10 which is essential to proper operation and protection of the thrust bearings with which apparatus having couplings of the present type, are ordinarily also equipped.

According to our invention the bushing 22 seated upon and around the cylindrically enlarged portion 17 of the bolt has an external flange around its outer end as indicated at 23 adjacent to the head 16 of the bolt, and the cylindrical rubber cushion 24 which seats upon this bushing 22 abuts at one end against the bushing flange 23.

In further accordance with our invention, a cylindrical casing 25 is formed to surround the cushion 24 and to slidably interfit the opening 21 of coupling member 10, and this casing preferably formed of bronze, has an inturned annular flange 26 at its outer end which overlaps the flange 23 of the bushing and extends between the latter and the bolt head 16. The opposite end of the casing, which projects slightly beyond the inner or adjacent end of the cushion 24, is reduced in thickness as at 27, in order that it may be readily rolled inwardly over the outer edge of a retaining ring 28, which is seated against the inner end of the cushion.

In this way the cushion is fully protected from oil, water and grime, the casing preventing the rubber from swelling and binding in the openings of the coupling member 10, and insuring free easy movement of the coupling elements in the coupling member 10 at all times. This casing and its flexible support, which latter is maintained in uniformly effective condition by our invention, prevents uneven wearing of the walls of the openings of the coupling member 10 and insures an increase in the general efficiency of the coupling as a whole, as well as the uniform elastic life of the cushion itself.

We claim:—

1. In a flexible coupling of the type described, a series of coupling elements each including a cylindrical cushion, a spindle or support having a head at one end, a bushing around the spindle and upon which the cushion is disposed, said bushing having an external flange at one end adjacent to and spaced from the spindle head, a casing surrounding the cushion and having an internal annular flange at its outer end overlapping the flange of the bushing and extending between the latter and the spindle head, and a retaining ring engaged and held in connection with the inner end of the casing against the inner end of the cushion, as described.

2. In a flexible coupling of the character described, a series of coupling elements each including a spindle or support having a head at one end, and a bushing on said spindle having an external annular flange at its outer end adjacent to the spindle head, a cylindrical cushion on the bushing, a retaining ring against the inner end of the cushion, and a casing around the bushing having an internal annular flange at its outer end overlapping the flange of the bushing and extending between the latter and the spindle head, said casing having its inner end reduced in thickness and engaged with the outer peripheral portion of the said retaining ring.

ALBERT PAUL FOLEY.
WILLIAM SHARPE WEIR.